United States Patent
McMahan et al.

(10) Patent No.: US 11,120,102 B2
(45) Date of Patent: *Sep. 14, 2021

(54) SYSTEMS AND METHODS OF DISTRIBUTED OPTIMIZATION

(71) Applicant: Google LLC, Mountain View, CA (US)

(72) Inventors: Hugh Brendan McMahan, Seattle, WA (US); Jakub Konecny, Edinburgh (GB); Eider Brantly Moore, Seattle, WA (US); Daniel Ramage, Seattle, WA (US); Blaise H. Aguera-Arcas, Seattle, WA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/004,324

(22) Filed: Aug. 27, 2020

(65) Prior Publication Data

US 2020/0394253 A1    Dec. 17, 2020

Related U.S. Application Data

(63) Continuation of application No. 16/558,945, filed on Sep. 3, 2019, now Pat. No. 11,023,561, which is a
(Continued)

(51) Int. Cl.
*G06F 17/17* (2006.01)
*G06N 20/00* (2019.01)
(Continued)

(52) U.S. Cl.
CPC .............. *G06F 17/17* (2013.01); *G06F 17/11* (2013.01); *G06F 30/00* (2020.01); *G06N 20/00* (2019.01); *G06F 2111/02* (2020.01)

(58) Field of Classification Search
CPC .......... G06F 17/17; G06F 30/00; G06F 17/11; G06F 2111/02; G06N 20/00
See application file for complete search history.

(56) References Cited

U.S. PATENT DOCUMENTS 6,687,653 B1   2/2004 Kurien et al.
6,708,163 B1   3/2004 Kargupta et al.
(Continued)

FOREIGN PATENT DOCUMENTS

CN    103327094    9/2013
CN    103534687    1/2014
WO    WO 2015126858  8/2015

OTHER PUBLICATIONS

Ailon et al., "Approximate Nearest Neighbors and the Fast Johnson-Lindenstrauss Transform", 38th Annual ACM Symposium on Theory of Computing, Seattle, Washington, May 21-23, 2006, 7 pages.
(Continued)

*Primary Examiner* — Saif A Alhija
(74) *Attorney, Agent, or Firm* — Dority & Manning, P.A.

(57) ABSTRACT

Systems and methods of determining a global model are provided. In particular, one or more local updates can be received from a plurality of user devices. Each local update can be determined by the respective user device based at least in part on one or more data examples stored on the user device. The one or more data examples stored on the plurality of user devices are distributed on an uneven basis, such that no user device includes a representative sample of the overall distribution of data examples. The local updates can then be aggregated to determine a global model.

15 Claims, 3 Drawing Sheets

Related U.S. Application Data continuation of application No. 15/045,707, filed on Feb. 17, 2016, now Pat. No. 10,402,469.

(60) Provisional application No. 62/242,771, filed on Oct. 16, 2015.

(51) Int. Cl.
  G06F 17/11     (2006.01)
  G06F 30/00     (2020.01)
  G06F 111/02    (2020.01)

(56) References Cited

U.S. PATENT DOCUMENTS

| | | |
|---|---|---|
| 6,879,944 B1 | 4/2005 | Tipping et al. |
| 7,069,256 B1 | 6/2006 | Campos |
| 7,664,249 B2 | 2/2010 | Horvitz et al. |
| 8,018,874 B1 | 9/2011 | Owechko |
| 8,239,396 B2 | 8/2012 | Byun et al. |
| 8,321,412 B2 | 11/2012 | Yang et al. |
| 8,429,103 B1 | 4/2013 | Aradhye et al. |
| 8,954,357 B2 | 2/2015 | Faddoul et al. |
| 9,190,055 B1 | 11/2015 | Kiss et al. |
| 9,275,398 B1 | 3/2016 | Kumar et al. |
| 9,336,483 B1 | 5/2016 | Abeysooriya et al. |
| 9,390,370 B2 | 7/2016 | Kingsbury |
| 9,424,836 B2 | 8/2016 | Lee et al. |
| 2005/0138571 A1 | 6/2005 | Keskar et al. |
| 2006/0224579 A1 | 10/2006 | Zheng |
| 2008/0209031 A1 | 8/2008 | Zhu et al. |
| 2010/0132044 A1 | 5/2010 | Kogan et al. |
| 2011/0085546 A1 | 4/2011 | Capello et al. |
| 2012/0016816 A1 | 1/2012 | Yanase et al. |
| 2012/0226639 A1 | 9/2012 | Burdick et al. |
| 2012/0310870 A1 | 12/2012 | Caves et al. |
| 2014/0214735 A1 | 7/2014 | Harik et al. |
| 2015/0170053 A1* | 6/2015 | Miao .............. G06N 20/00 706/12 |
| 2015/0186798 A1 | 7/2015 | Vasseur et al. |
| 2015/0193695 A1 | 7/2015 | Cruz Mota et al. |
| 2015/0195144 A1 | 7/2015 | Vasseur et al. |
| 2015/0242760 A1 | 8/2015 | Miao et al. |
| 2015/0324690 A1 | 11/2015 | Chilimbi et al. |

OTHER PUBLICATIONS

Alistarh et al., "QSGB: Randomized Quantization for Communication-Optimal Stochastic Gradient Descent", arXiv:1610.02132v1, , Oct. 7, 2016, 22 pages.
Al-Rfou et al., "Conversational Contextual Cues: The Case of Personalization and History for Response Ranking", arXiv:1606.00372v1, Jun. 1, 2016, 10 pages.
Arjevani et al., "Communication Complexity of Distributed Convex Learning and Optimization", Neural Information Processing Systems, Montreal, Canada, Dec. 7-12, 2015, 9 pages.
Balcan et al., "Distributed Learning, Communication Complexity and Privacy", Conference on Learning Theory, Edinburgh, Scotland, Jun. 25-27, 2012, 19 pages.
Bonawitz et al., "Practical Secure Aggregation for Federated Learning on User-Held Data", arXiv1611.04482v1, Nov. 14, 2016, 5 pages.
Braverman et al., "Communication Lower Bounds for Statistical Estimation Problems via a Distributed Data Processing Inequality", 48$^{th}$ Annual ACM Symposium on Theory of Computing, Cambridge, Massachusetts, Jun. 19-21, 2016, pp. 1011-1020, 11 pages.
Chaudhuri et al., "Differentially Private Empirical Risk Minimization", Journal of Machine Learning Research, vol. 12, Jul. 12, 2011, pp. 1069-1109.
Chen et al., "Revisiting Distributed Synchronous SGD", arXiv.1604.00981v3, Mar. 21, 2017, 10 pages.
Chen et al., "Communication-Optimal Distributed Clustering", Neural Information Processing Systems, Barcelona, Spain, Dec. 5-10, 2016, 9 pages.
Chilimbi et al., "Project Adam: Building an Efficient and Scalable Deep Learning Training System", 11th USENIX Symposium on Operating Systems Design and Implementation, Broomfield, Colorado, Oct. 6-8, 2014, pp. 571-582.
European Search Report for Application No. 16856233.8, dated Nov. 20, 2018, 9 pages.
Dasgupta et al., "An Elementary Proof of a Theorem of Johnson and Lindenstrauss", Random Structures & Algorithms, vol. 22, Issue I, 2003, pp. 60-65.
Dean et al., "Large Scale Distributed Deep Networks", Neural Information Processing Systems, Dec. 3-8, 2012, Lake Tahoe, 9 pages.
Denil et al., "Predicting Parameters in Deep Learning",26th International Conference on Neural Information Processing Systems, Lake Tahoe, Nevada, Dec. 5-10, 2013, pp. 2148-2156.
Duchi et al., "Privacy Aware Learning", arXiv:1210.2085v2, Oct. 10, 2013, 60 pages.
Dwork et al., "The Algorithmic Foundations of Differential Privacy", Foundations and Trends in Theoretical Computer Science, vol. 9, Nos. 3-4, 2014, pp. 211-407.
Efron et al., "The Jackknife Estimate of Variance", The Annals of Statistics, vol. 9, Issue 3, May 1981, pp. 586-596.
Elias, "Universal Codeword Sets and Representations of the Integers", IEEE Transactions on Information Theory, vol. 21, Issue 2, Mar. 1975, pp. 194-203.
Falahatgar et al., "Universal Compression of Power-Law Distributions", arXiv:1504.08070v2, May 1, 2015, 20 pages.
Fercoq et al., "Fast Distributed Coordinate Descent for Non-Strongly Convex Losses", arXiv:1405.5300v1, May 21, 2014, 6 pages.
Gamal et al., "On Randomized Distributed Coordinate Descent with Quantized Updates", arXix:1609.05539v1, Sep. 18, 2016, 5 pages.
Garg et al., "On Communication Cost of Distributed Statistical Estimation and Dimensionality", Neural Information Processing Systems, Montreal, Canada, Dec. 8-13, 2014, 9 pages.
Golovin et al., "Large-Scale Learning with Less Ram via Randomization", arXix:1303.4664v1, Mar. 19, 2013, 10 pages.
Han et al., "Deep Compression: Compressing Deep Neural Networks with Pruning, Trained Quantization and Huffman Coding", arXiv:1510.00149v5, Nov. 20, 2015, 13 pages.
Ho et al., "More Effective Distributed ML via a Stale Synchronous Parallel Parameter Server", Neural Information Processing Systems, Dec. 5-10, 2013, Lake Tahoe, 9 pages.
Horadam, "Hadamard Matrices and Their Applications", Princeton University Press, 2007.
International Search Report from PCT/US2016/056954 dated Jan. 25, 2017, 15 pages.
Jaggi et al., "Communication-Efficient Distributed Dual Coordinate Ascent", arXiv:1409.458v2, Sep. 29, 2014, 15 pages.
Johnson et al., "Accelerating Stochastic Gradient Descent Using Predictive Variance Reduction" Advances in Neural Information Processing Systems, Lake Tahoe, Nevada, Dec. 5-10, 2013, pp. 315-323.
Konecny et al., "Federated Optimization: Distributed Machine Learning for On-Device Intelligence", arXiv:1610.02527v1, Oct. 8, 2016, 38 pages.
Konecny et al., "Federated Optimization: Distributed Optimization Beyond the Datacenter", arXiv:1511.03575v1, Nov. 11, 2015, 5 pages.
Konecny et al., "Semi-Stochastic Gradient Descent Methods", arXiv:1312.1666v1, Dec. 5, 2013, 19 pages.
Konecny et al., "Federated Learning: Strategies for Improving Communication Efficiency", arXiv:610.05492v1, Oct. 18, 2016, 5 pages.
Konecny et al., "Randomized Distributed Mean Estimation: Accuracy vs. Communication", arXiv:1611.07555v1, Nov. 22, 2016, 19 pages.
Krichevsky et al., "The Performance of Universal Encoding", IEEE Transactions on Information Theory, vol. 27, Issue 2, Mar. 1981, pp. 199-207.

(56) References Cited

OTHER PUBLICATIONS

Krizhevsky, "Learning Multiple Layers of Features from Tiny Images", Technical Report, Apr. 8, 2009, 60 pages.
Krizhevsky, "One Weird Trick for Parallelizing Convolutional Neural Networks", arXiv:1404.59997v2, Apr. 26, 2014, 7 pages.
Kumar et al., "Fugue: Slow-Worker-Agnostic Distributed Learning for Big Models on Big Data", Journal of Machine Learning Research: Workshop and Conference Proceedings, Apr. 2014, 9 pages.
Livni et al., "An Algorithm for Training Polynomial Networks", arXiv:1304.7045v1, Apr. 26, 2013, 22 pages.
Livni et al., "On the Computational Efficiency of Training Neural Networks" arXiv:1410.1141v2, Oct. 28, 2014, 15 pages.
Lloyd, "Least Squares Quantization in PCM", IEEE Transactions on Information Theory, vol. 28, Issue 2, Mar. 1982, pp. 129-137.
Ma et al., "Adding vs. Averaging in Distributed Primal-Dual Optimization", arXix:1502.03508v2, Jul. 3. 2015, 19 pages.
Ma et al., "Distributed Optimization with Arbitrary Local Solvers", arXiv:1512.04039v2, Aug. 3, 2016, 38 pages.
MacKay, "Information Theory, Inference and Learning Algorithms", Cambridge University Press, 2003.
Mahajan, et al., "A Functional Approximation Based Distributed Learning Algorithm", Oct. 31, 2013, https://arXiv.org/pdf/1310.8418v1, retrieved on Nov. 15, 2018.
Mahajan, et al., "An Efficient Distributed Learning Algorithm Based on Approximations", Journal of Machine Learning Research, Mar. 16, 2015, pp. 1-32, https://arXix.org/pdf/131.0.8418.pdf, retrieved on Nov. 15, 2018.
McDonald et al.. "Distributed Training Strategies for the Structures Perceptron", Human Language Technologies: The 2010 Annual Conference of the North American Chapter of the Association for Computational Linguistics, Los Angeles, California, Jun. 2-4, 2010, 9 pages.
McMahan et al., "Communication-Efficient Learning of Deep Networks from Decentralized Data", arXiv:1602.05629v3, Feb. 28, 2017, 11 pages.
McMahan et al., "Federated Learning: Collaborative Machine Learning without Centralized Training Data", Apr. 6, 2017, https://research.googleblog.com/2017/04/federated-learning-collaborative.html, retrieved on Oct. 3, 2018, 5 pages.
McMahan et al., "Federated Learning of Deep Networks using Model Averaging", arXiv:1602.05629, Feb. 17, 2016, 11 pages.
Nedic et al, "Distributed Subgradient Methods for Multi-Agent Optimization", Transactions on Automatic Control, vol. 54, No. 1, Jan. 2009.
Povey et al., "Parallel Training of Deep Neural Networks with Natural Gradient and Parameter Averaging", arVix:1410.7455v1, Oct. 27, 2014, 21 pages.
Qu et al., "Coordinate Descent with Arbitrary Sampling I: Algorithms and Complexity", arXiv:1412.8060v2, Jun. 15, 2015, 32 pages.
Qu et al., "Quartz: Randomized Dual Coordinate Ascent with Arbitrary Sampling", arXiv:1411.5873v1, Nov. 21, 2014, 34 pages.
Rabbat et al., "Quantized Incremental Algorithms for Distributed Optimization", Journal on Selected Areas in Communications, vol. 23, No. 4, 2005, pp. 798-808.
Reddy et al., "AIDE: Fast and Communication Efficient Distributed Optimization", arXiv:1608.06879v1, Aug. 24, 2016, 23 pages.
Richtarik et al., "Distributed Coordinate Descent Method for earning with Big Data", arXiv:1310.2059v1, Oct. 8, 2013, 11 pages.
Seide et al., "1-Bit Stochastic Gradient Descent and Application to Data-Parallel Distributed Training of Speech DNNs", $15^{th}$ Annual Conference of the International Speech Communication Association, Singapore, Sep. 14-18, 2014, pp. 1058-1062.
Shamir et al., "Communication-Efficient Distributed Optimization Using an Approximate Newton-Type Method", arXiv1312.7853v4, May 13, 2013, 22 pages.
Shamir et al., "Distributed Stochastic Optimization and Learning", 52nd Annual Allerton Conference on Communication, Control, and Computing, Monticello, Illinois, Oct. 1-3, 2014, pp. 850-857.
Shokri et al., "Privacy-Preserving Deep Learning" Proceedings of the 22nd ACM SIGSAC Conference on Computer and Communications Security, Denver, Colorado, Oct. 12-16, 2015, 12 pages.
Springenberg et al., "Striving for Simplicity: The All Convolutional Net", arXiv:1412.6806v3, Apr. 13, 2015, 14 pages.
Suresh et al., "Distributed Mean Estimation with Limited Communication", arXiv.1611.00429v3, Sep. 25, 2017, 17 pages.
Tsitsiklis et al., "Communication Complexity of Convex Optimization", Journal of Complexity, vol. 3, Issue 3. Sep. 1, 1987, pp. 231-243.
Wikipedia, "Rounding", https://en.wikipedia.org/wiki/Rounding, retrieved on Aug. 14, 2017, 13 pages.
Woodruff, "Sketching as a Tool for Numerical Linear Algebra", arXiv:1411.4357v3, Feb. 10, 2015, 139 pages.
Xie et al., "Distributed Machine Learning via Sufficient Factor Broadcasting", arXiv:1409.5705v2, Sep. 7, 2015, 15 pages.
Xing et al., "Petuum: A New Platform for Distributed Machine Learning on Big Data", Conference on Knowledge Discovery and Data Mining, Aug. 10-13, 2015, Hilton, Sydney, 10 pages.
Yadan et al., "Multi-GPU Training of ConvNets", International Conference on Learning Representations, Apr. 14-16, 2014, Banff, Canada, 4 pages.
Yang, "Trading Computation for Communication: Distributed Stochastic Dual Coordinate Ascent", Advances in Neural information Processing Systems, Lake Tahoe, Nevada, Dec. 5-10, 2013, pp. 629-637.
Yu et al., "Circulant Binary Embedding", arXiv:1405.3162v1, May 13, 2014, 9 pages.
Yu et al., "Orthogonal Random Features", Neural Information Processing Systems, Barcelona, Spain, Dec. 5-10, 2016, 9 pages.
Zhang et al., "Communication-Efficient Algorithms for Statistical Optimization", arXiv.1209.4129v3, Oct. 11, 2013, 44 pages.
Zhang et al., "Communication-Efficient Distributed Optimization of Self Concordant Empirical Loss", arXiv:1501.00263v1, Jan. 1, 2015, 46 pages.
Zhang et al., "DISCO: Distributed Optimization for Self-Concordant Empirical Loss", 32nd International Conference on Machine Learning, vol. 37, 2015, pp. 362-370.
Zhang et al., "Information-Theoretic Lower Bounds for Distributed Statistical Estimation with Communication Constraints", Neural Information Processing Systems, Lake Tahoe, Nevada, Dec. 5-10, 2013, 9 pages.
Zhang et al., "Poseidon: A System Architecture for Efficient GPU-based Deep Learning on Multiple Machines", arXiv:1512.06216v1, Dec. 19, 2015, 14 pages.

* cited by examiner

SYSTEMS AND METHODS OF DISTRIBUTED OPTIMIZATION

PRIORITY CLAIM

The present application is a continuation of U.S. application Ser. No. 16/558,945 having a filing date of Sep. 3, 2019, which is a continuation of U.S. application Ser. No. 15/045,707 having a filing date of Feb. 17, 2016, which claims the benefit of U.S. Provisional Application Ser. No. 62/242,771 filed Oct. 16, 2015. Applicant claims priority to and the benefit of each of such applications. Applicant hereby incorporates each of U.S. application Ser. No. 15/045,707 and U.S. application Ser. No. 16/558,945 by reference in its entirety.

FIELD

The present disclosure relates generally to distributed optimization algorithms, and more particularly to performing optimization algorithms using data distributed unevenly among a large number of computational nodes.

BACKGROUND

In recent years, machine learning has been increasingly used to solve a number of problems. The amount of data collected for use in solving such problems has also increased in recent years. As the amount of such data increases, it can become difficult to store an entire dataset at a single location. In this manner, no single computing device may have direct access to the entire dataset needed to solve a problem. Conventional training methods for solving machine learning problems in such environments can include collecting a plurality of training data examples at a centralized location (e.g. a server device) wherein the data examples can be shuffled and redistributed evenly among the computing devices.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of updating a global model based on unevenly distributed data. The method includes receiving, by one or more computing devices, one or more local updates from a plurality of user devices. Each local update is determined by the respective user device based at least in part on one or more data examples stored on the respective user device. The one or more data examples stored on the plurality of user devices are distributed on an uneven basis, such that no user device includes a representative sample of an overall distribution of data examples. The method further includes aggregating, by the one or more computing devices, the received local updates to determine a global model.

Other example aspects of the present disclosure are directed to systems, apparatus, tangible, non-transitory computer-readable media, user interfaces, memory devices, and electronic devices for solving optimization problems in distributed data environments.

These and other features, aspects and advantages of various embodiments will become better understood with reference to the following description and appended claims.

The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
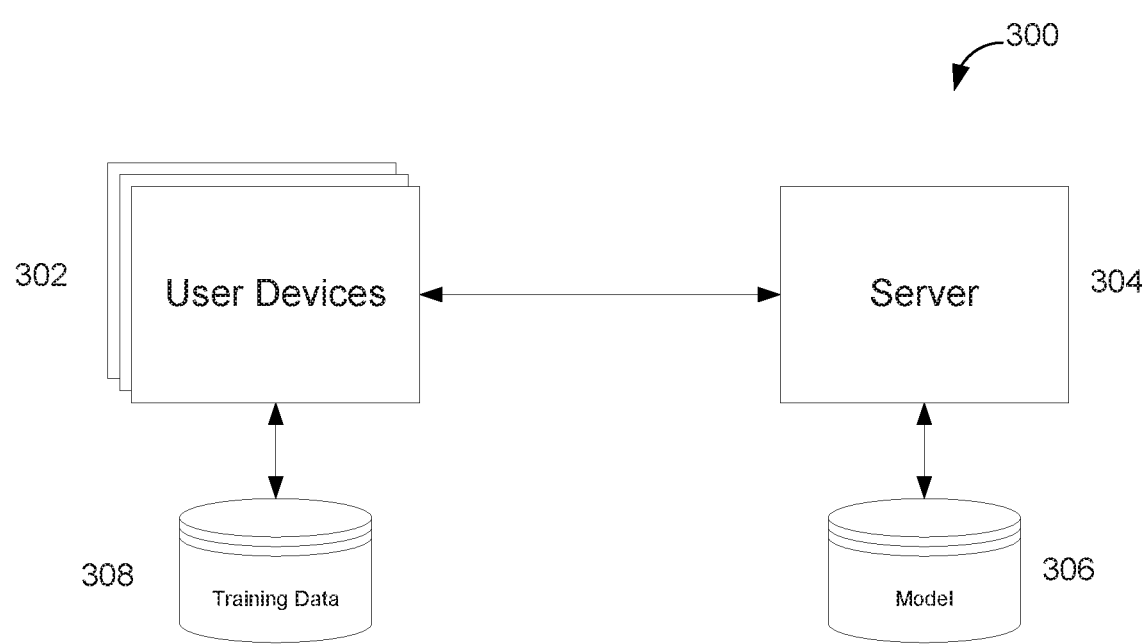
FIG. 1 depicts an example computing system for implementing optimization techniques over a plurality of nodes according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to solving optimization problems defined by an unevenly distributed dataset. For instance, data points used in solving an optimization problem may be stored across a plurality of devices. In this manner, the data on each device may be differently distributed, and may not be a representative sample of the overall distribution of data. For instance, each device may store different amounts of data, and/or different types of data. For instance, some data features may occur on only a small subset of devices.

In this setting, communication efficiency is important and the need to minimize rounds of communication can be a goal. In particular, communication constraints arise naturally in the massively distributed setting, as network connectivity may be limited (e.g., one may wish to defer all communication until the mobile device is charging and connected to a Wi-Fi network). Thus, in realistic scenarios the system may be limited to only a single round of communication per day. This implies that, within reasonable bounds, access to local computational power is more available than communication bandwidth. As a result, one practical objective can be to minimize the rounds of communication.

According to a particular implementation, a central computing device, such as a server or data center can provide data indicative of a current global model to the plurality of computing devices. The plurality of computing devices can determine one or more local updates to the model using data stored on the respective computing devices. For instance, in some implementations, at least one of the computing devices can be a user device, such as a wearable computing device or other user device. The data examples may be generated, for instance, through interaction of a user with the user device. In this manner, the local update can correspond to a model using data generated through use of the user device by the user. For instance, the data examples may include, without limitation, image files, video files, inputted text, or data indicative of other interactions by the user with the user device. The model may be implemented in solving one or more problems, such as predictive typing, predictive image sharing, image classification, voice recognition, next-word-prediction, and/or various other suitable problems relating to use of the user device.

Each computing device can then provide the local update(s) to the central computing device. For instance, the local update can be a gradient vector. In some implementations, the local update may be determined using one or more gradient descent techniques. For instance, the local update may be determined using batch gradient descent techniques, stochastic gradient descent techniques, or other gradient descent techniques. The local update does not include the training data used to determine the local update. In this manner, the size of the local update can be independent of the training data used to determine the local update, thereby reducing bandwidth requirements and maintaining user privacy. In particular, a global model can be updated based at least in part on the received local updates. By only providing the local update (and not the training data) to the server, the global model update can be determined using reduced bandwidth requirements, and without compromising the security of potentially privacy sensitive data stored on the user devices. In addition, through aspects of the present disclosure, the global model can be trained using a smaller number of communication rounds, and so this also reduces the network bandwidth needed for training by orders of magnitude compared to copying the data to the datacenter. In some implementations, the global model update can be a global model parameter vector. In particular, the global model update can be determined by aggregating each local update received by the server. In some implementations, the aggregation can include determining a weighted average of the received local updates.

In some implementations, if additional privacy is needed, randomization techniques from differential privacy can be used. The centralized algorithm could be modified to produce a differentially private model, which allows the model to be released while protecting the privacy of the individuals contributing updates to the training process. If protection from even a malicious (or compromised) centralized model trainer is needed, techniques from local differential privacy can be applied to privatize the individual updates.

More particularly, in some embodiments, a set of input-output data can be used to describe a global objective via a loss function. Such functions can be, for instance, a convex or non-convex function, such as a linear regression function, logistic regression function, a support vector machine, neural network function and/or various other suitable functions. A local objective ($F_k$) can also be defined using data stored on a computing device. For instance, the global objective can be defined as:

$$f(w) = \sum_{k=1}^{K} \frac{n_k}{n} F_k(w) = \sum_{k=1}^{K} \frac{n_k}{n} \cdot \frac{1}{n_k} \sum_{i \in \mathcal{P}_k} f_i(w)$$

wherein K describes the number of computing devices, n describes a total number of data examples, $n_k$ describes the number of data examples stored on computing device k, and $\mathcal{P}_k$ describes a partition of data example indices $\{1, \ldots, n\}$ stored on the computing device k. In this manner, the local objective can specify an optimization problem to be solved by device k. According to particular implementations of the present disclosure, the global objective can be solved by aggregating a plurality of local updates provided by a plurality of remote computing devices. Each remote computing device can, for instance, be a user device, such as a laptop computing device, desktop computing device, smartphone, tablet, wearable computing device, or other computing device. The local updates can be determined based at least in part on the respective local objectives.

In particular, a gradient of the global objective can be determined. For instance, each computing device can be configured to determine the gradient of the local objective using the data examples stored on the computing device. In some implementations, the global gradient may be equal to a weighted sum of the local gradients. In implementations wherein the global gradient and the local gradients are not equal, each remote computing device can be configured to provide the determined gradient to the central computing device (e.g. server device, data center, etc.). The central device can then be configured to determine a gradient of the global objective based at least in part on the local objective gradients, and then to provide the gradient to the remote computing devices. For instance, the gradient can be defined as:

$$\nabla f(\tilde{w}) = \frac{1}{n} \sum_{i=1}^{n} \nabla f_i(\tilde{w})$$

Each remote computing device can then determine a local update based at least in part on the global gradient. For instance, the local update can be determined using one or more gradient descent techniques (e.g. stochastic gradient descent). In this manner, each remote computing device can perform one or more stochastic updates or iterations to determine the local update. More particularly, each remote computing device can initialize one or more parameters associated with the local objective. Each remote computing device can then, for instance, uniformly, randomly sample Pk for one or more stochastic iterations. In this manner, the local update can be determined based at least in part on the sampled data. In particular, the local update can be defined as:

for $t=1$ to $m$ do

Sample $i \in \mathcal{P}_k$ uniformly at random $w_k = w_k - h(\nabla f_i(w_k) - \nabla f_i(\tilde{w}_s) + \nabla f(\tilde{w}_s))$ wherein m is a number of stochastic steps per iteration, and h is the stepsize.

The local updates can then be provided to the central computing device. In particular, the local updates can be gradient vectors. The central computing device can then aggregate the local updates to determine a global update to the model. For instance, the aggregation can be an averaging aggregation defined as:

$$\tilde{w} = \tilde{w} + \frac{1}{K} \sum_{k=1}^{K} (w_k - \tilde{w})$$

This can be repeated for one or more iterations, for instance, until the loss function reaches a threshold (e.g. converges). The threshold can be determined based at least in part on a desired accuracy of the global model. As another example, the threshold can be determined based at least in part on the amount of time required for communication between the central computing device and the remote computing devices.

The above process can be modified to achieve good empirical performance in the full federated setting. This setting can come with the data available locally being clustered around specific pattern, and thus not being a representative sample of the overall distribution that the system is attempting to learn.

Note that in large scale generalized linear prediction problems, the data arising are very frequently sparse, for example due to bag-of-words style feature representations. This means that only a small subset of d elements of vector $x_i$ have nonzero values. In the case of linear predictors, the gradient is a multiple of the data vector $x_i$. This creates additional complications, but also potential for exploitation of the problem structure and thus faster algorithms.

In particular, aspects of the present disclosure provide solutions when encountering a setting with data sparsity. If one looks at how frequently a feature appears in the whole dataset, and find out that locally, the feature appears much more often, the node with such local data is going to overshoot in estimates of gradient in this feature. Simply because the device samples this feature more often than the system would if it were sampling from the whole dataset. For this reason, among others, embodiments of the present disclosure scale local stochastic gradients by ratio of per-feature appearance frequencies globally, and locally.

Some notation is now provided.

n—number of data examples/data points/functions.

$\mathcal{P}_k$—set of indices, corresponding to data points stored on device k.

$n_k = |\mathcal{P}_k|$—number of data points stored on device k.

$n^j = |\{i \in [n]: \langle x_i, e_j \rangle \neq 0\}|$—the number of data points with nonzero $j^{th}$ coordinate.

$n_k^j = |\{i \in \mathcal{P}_k: \langle x_i, e_j \rangle \neq 0\}|$—the number of data points stored on node k with nonzero $j^{th}$ coordinate.

$\phi^j = n^j/n$—frequency of appearance of nonzero elements in $j^{th}$ coordinate.

$\phi_k^j = n_k^j/n_k$—frequency of appearance of nonzero elements in $j^{th}$ coordinate on node k.

$s_k^j = \phi^j/\phi_k^j$—ratio of global and local appearance frequencies on node k in $j^{th}$ coordinate.

$S_k = \text{Diag}(s_k^j)$—diagonal matrix, composed of $s_k^j$ as $j^{th}$ diagonal element.

$w^j = |\{\mathcal{P}_k: n_k^j \neq 0\}|$—Number of nodes that contain data point with nonzero $j^{th}$ coordinate.

$\alpha^j = K/w^j$—aggregation parameter for coordinate j.

$A = \text{Diag}(\alpha^j)$—diagonal matrix composed of $\alpha^j$ as $j^{th}$ diagonal element.

In example embodiments, the local objective can further be determined based at least in part on the distribution of data among the remote computing devices. In particular, a local stepsize ($h_k$) associated with the stochastic gradient descent for each remote computing device can be determined based at least in part on the number of data examples stored on the remote computing device (e.g., $h_k = h/n_k$).

Further, the local objective or stochastic gradient can be scaled using a diagonal matrix ($S_k$). In this manner, the local objective can be defined as:

Let $\{i_t\}_{t=1}^{n_k}$ be random permutation of $\mathcal{P}_k$ for $t=1, \ldots, n_k$ do $w_k = w_k - h_k(S_k[\nabla f_{i_c}(w_k) - \nabla f_{i_c}(\tilde{w})] + \nabla f(\tilde{w}))$ In such embodiments, the aggregation of local updates by the central computing device can be proportional to the number of data examples $$\left(\text{e.g., } \frac{n_k}{n}(w_k - \tilde{w})\right).$$

The aggregation can further include a per-coordinate scaling of aggregated updates (e.g., $A(w_k - \tilde{w})$). In this manner, the global model can be an additive aggregation determined as follows:

$$\tilde{w} = \tilde{w} + A \sum_{k=1}^{K} \frac{n_k}{n}(w_k - \tilde{w})$$

Such embodiments can be determined under the assumption that, as some point in time, each remote computing device has the same local iterate. In this manner, each remote computing device can begin from the same point. A linear term:

$$\nabla F_k(\tilde{w}_s) - \nabla f(\tilde{w}_k)$$

can be added to the local objective to force all nodes to initially move in the same direction.

As an example, the update direction of remote computing device k can be denoted as:

$$G_k = \nabla f_i(w) - \nabla f_i(\tilde{w}) + f(\tilde{w})$$

wherein i is sampled uniformly at random from Pk. If there is only one remote computing device then:

$$\mathbb{E}[G_1] = \nabla f(w).$$

If there are more than one remote computing device, the values of Gk are biased estimates of the gradient of f(w). In this manner, $$\mathbb{E}\left[\sum_{k=1}^{K} \alpha_k G_k\right] = \nabla f(w)$$

can be achieved for some choice of $\alpha_k$. This can be motivated by a desire of stochastic first-order methods to perform a gradient step on expectation. In this manner, we have:

$$\mathbb{E}\left[\sum_{k=1}^{K} \alpha_k G_k\right] = \sum_{k=1}^{K} \alpha_k \frac{1}{n_k} \sum_{i \in \mathcal{P}_k} [\nabla f_i(w) - \nabla f_i(\tilde{w}) + \nabla f(\tilde{w})]$$

By setting $\alpha_k$ to nk/n, we get:

$$\mathbb{E}\left[\sum_{k=1}^{K} \alpha_k G_k\right] = \frac{1}{n} \sum_{k=1}^{K} \sum_{i \in \mathcal{P}_k} [\nabla f_i(w) - \nabla f_i(\tilde{w}) + \nabla f(\tilde{w})] = \nabla f(w)$$

This motivates the aggregation of updates from nodes proportional to $n_k$. The local stepsize $h_k$ can be included, for instance, when the number of data examples on each remote computing device is not equal. In such embodiments, it may not be beneficial to perform the same number of stochastic iterations on each remote device. In this manner, setting the stepsize as inversely proportional to the number of data examples on the remote device can allow each remote device to travel roughly the same distance. In this manner, the local and global model updates can be implemented as follows:

--- parameters: h = stepsize, data partition $\{\mathcal{P}_k\}_{k=1}^{K}$, diagonal matrices A, $S_k \in \mathbb{R}^{d \times d}$ for $k \in \{1, \ldots, K\}$
for s = 0, 1, 2, . . . do $$\text{Compute } \nabla f(\tilde{w}) = \frac{1}{n} \sum_{i=1}^{n} \nabla f_i(\tilde{w})$$

for k = 1 to K do in parallel over nodes k
  Initialize: $w_k = \tilde{w}$ and $h_k = h/n_k$
  Let $\{i_t\}_{t=1}^{n_k}$ be random permutation of $\mathcal{P}_k$
  for t = 1, . . . , $n_k$ do
    $w_k = w_k - h_k(S_k[\nabla f_{i_t}(w_k) - \nabla f_{i_t}(\tilde{w})] + \nabla f(\tilde{w}))$
  end for
end for $$\tilde{w} = \tilde{w} + A \sum_{k=1}^{K} \frac{n_k}{n} (w_k - \tilde{w})$$

end for

---

In further embodiments, the local objective can be defined as follows:

$$w_k = \underset{w \in \mathbb{R}^d}{\operatorname{argmin}} \left\{ n_k F_k(w) + (n \nabla f(\tilde{w}_s) - n_k \nabla F_k(\tilde{w}_s))^T w + \frac{\beta}{2} \left\| U^{\frac{1}{2}} (w - \tilde{w}_s) \right\|^2 \right\}.$$

In such embodiments, a diagonal matrix $U \in \mathbb{R}^{d \times d}$ is defined having diagonal entries:

$$u_j = \beta \frac{n^j}{n_k^j}$$

A regularizer term is defined as:

$$\frac{1}{2} \left\| U^{\frac{1}{2}} (w - \tilde{w}_s) \right\|^2.$$

The $u_j$ can correspond to a curvature in dimension i. For instance, $u_j = \beta$ can be very small when each ith data example is on the current remote computing device. In this manner, $w_j$ can be determined as desired by the remote computing device. In such embodiments, when $n_k^j = 0$, the regularization is infinitely strong, and the coefficients of features for which no data is present may not be changed.

In some implementations, stochastic gradient descent techniques can be naively applied to the optimization problem, wherein one or more "minibatch" gradient calculations (e.g. using one or more randomly selected use devices) are performed per round of communication. For instance, the minibatch can include at least a subset of the training data stored locally on the user devices. In such implementations, one or more user devices can be configured to determine the average gradient associated with the local training data respectively stored on the user devices for a current version of a model. The user devices can be configured to provide the determined gradients to the server, as part of the local updates. The server can then aggregate the gradients to determine a global model update. As another example, in some implementations, one or more user devices can perform one or more "steps" of gradient descent on the current model using at least a subset of the local training data respectively stored on the user devices, and provide data indicative of the one or more gradient descent steps to the server. The server can then aggregate the data, for instance, by determining a weighted average. For instance, the user devices may determine an updated version of the model (e.g. using one or more stochastic gradient descent techniques) using local data. The server can then determine a weighted average of the resulting models to determine a global update to the model.

With reference now to the figures, example embodiments of the present disclosure will be discussed in further detail. For instance, FIG. 1 depicts an example system 300 for training one or more global machine learning models 306 using training data 308 stored locally on a plurality of user devices 302. System 300 can further include a server device 304. Server 304 can be configured to access machine learning model 306, and to provide model 306 to a plurality of user devices 302. Model 306 can be, for instance, a linear regression model, logistic regression model, a support vector machine model, a neural network (e.g. convolutional neural network, recurrent neural network, etc.), or other suitable model. In some implementations, sever 304 can be configured to communicate with user devices 302 over one or more networks, such as network 240 of FIG. 3.

User devices 302 can each be configured to determine one or more local updates associated with model 306 based at least in part on training data 308. For instance, training data 308 can be data stored locally on the user devices 306. In this manner, training data 308 can include audio files, image files, video files, a typing history, location history, and/or various other suitable data. In some implementations, the training data can be any data derived through a user interaction with a user device 302.

In some implementations, the local updates can be a gradient vector associated with the model. For instance, user devices 302 can determine a gradient (e.g. an average gradient) associated with the model based at least in part on training data 308 respectively stored on user devices 302. In some implementations, the local update can include an updated version of model 306 determined by taking one or more stochastic gradient descent steps. It will be appreciated that the local updates can include any suitable data indicative of one or more local training techniques respectively performed by user devices 302 based at least in part on training data 308. In some implementations, the local updates can include one or more training passes, or epochs. In this manner the minibatch of training data can be applied one or more times to determine the local update.

User devices 302 can then be configured to provide the local updates to server 304. As indicated above, training data 308 may be privacy sensitive. In this manner, the local updates can be performed and provided to server 304 without compromising the privacy of training data 308. For instance, in such implementations, training data 308 is not provided to server 304. The local update does not include training data 308. In implementations, wherein a locally updated model is provided to server 304, privacy sensitive data may be able to be derived or inferred from the model parameters. In such implementations, one or more encryption, random noise techniques, and/or other security techniques can be added to the training process to obscure any inferable information.

As indicated above, server 304 can receive each local update from user device 302, and can aggregate the local updates to determine a global update to the model. In some implementations, server 304 can determine a weighted average of the local updates and determine the global update based at least in part on the average.

In some implementations, scaling or other techniques can be applied to the local updates to determine the global update. For instance, a local stepsize can be applied for each user device 302, the aggregation can be performed proportionally to various data partition sizes of user devices 302, and/or one or more scaling factors can be applied to the local and/or aggregated updates. It will be appreciated that various other techniques can be applied without deviating from the scope of the present disclosure.

Figure 2:
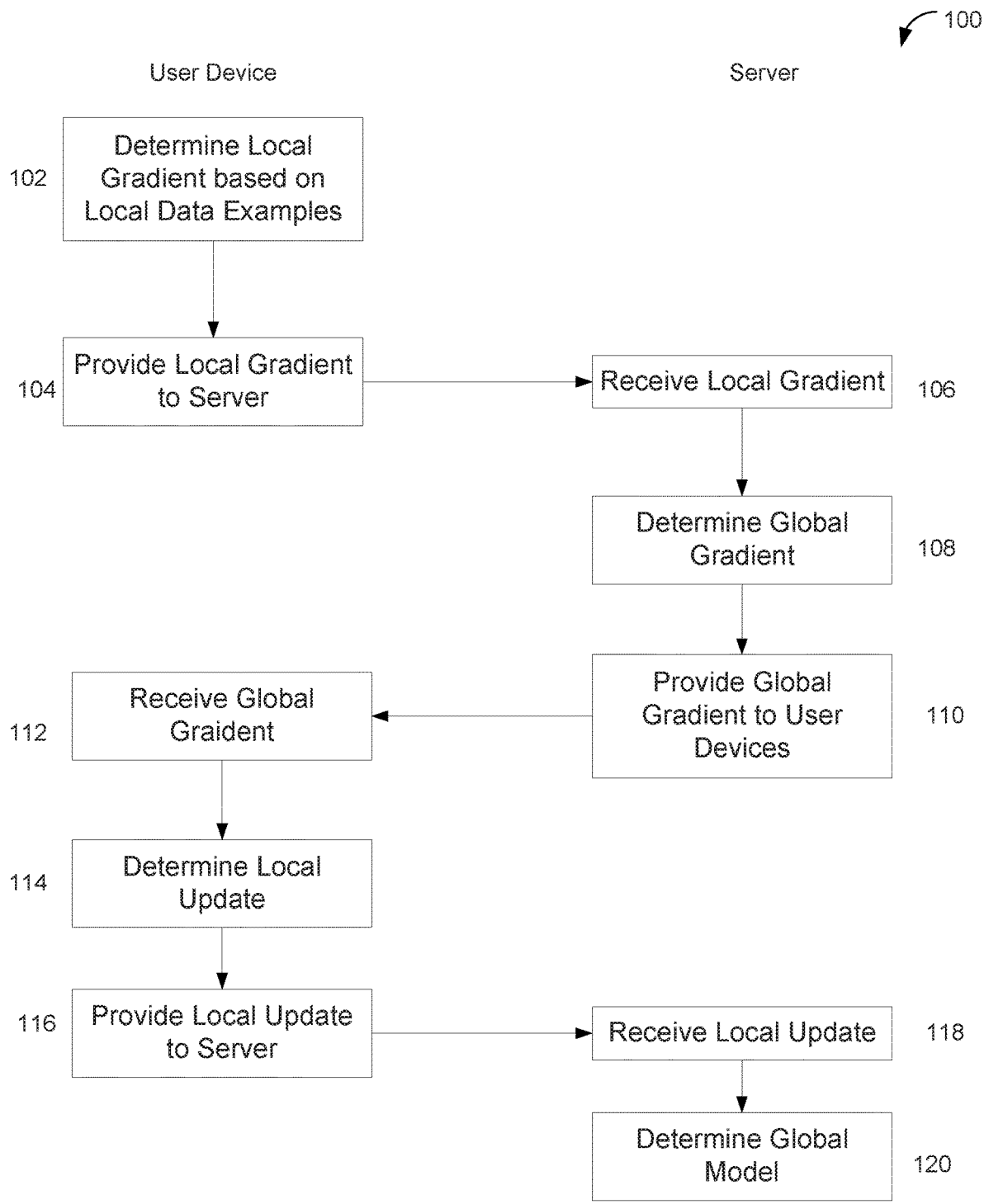
FIG. 2 depicts a flow diagram of an example method of determining a global model according to example aspects of the present disclosure.

FIG. 2 depicts a flow diagram of an example method (100) of determining a global model according to example embodiments of the present disclosure. Method (100) can be implemented by one or more computing devices, such as one or more of the computing devices depicted in FIG. 3. In addition, FIG. 2 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (102), method (100) can include determining, by a user device, a local gradient based on one or more local data examples. In particular, the local gradient can be determined for a loss function using the one or more data examples. In some implementations, the user device can be a wearable computing device. The data examples may be generated, for instance, through interaction of a user with the user device. At (104), method (100) can include providing, by the user device, the local gradient to a server, and at (106), method (100) can include receiving, by the server, the local gradient.

At (108), method (100) can include determining, by the server, a global gradient based at least in part on the received local gradient. For instance, the can be determined based at least in part on a plurality of local gradients provided by a plurality of user devices, each having a plurality of unevenly distributed data examples. In particular, the data example may be distributed among the user devices such that no user device includes a representative sample of the overall distribution of data. In addition, the number of user devices may exceed the number of data examples on any one user device.

At (110), method (100) can include providing the global gradient to each user device, and at (112), method (100) can include receiving the global gradient.

At (114), method (100) can include determining, by the user device, a local update. In a particular implementation, the local update can be determined based at least in part on the global update. In other implementations, the global gradient may not be required to determine the local update. For instance, in such implementations, each local gradient may be identical. In such embodiments, the global gradient may not be determined by the server, and method (100) can bypass (104)-(112).

The local update can be determined based at least in part using one or more stochastic updates or iterations. For instance, the user device may randomly sample a partition of data examples stored on the user device to determine the local update. In particular, the local update may be determined using stochastic gradient descent techniques to determine a direction in which to adjust one or more parameters of the loss function.

In some embodiments, a stepsize associated with the local update determination can be determined based at least in part on a number of data examples stored on the user device. In further embodiments, the stochastic gradient can be scaled using a diagonal matrix, or other scaling technique. In still further embodiments, the local update can be determined using a linear term that forces each user device to update the parameters of the loss function in the same direction.

At (116), method (100) can include providing, by the user device, the local update to the server, and at (118), method (100) can include receiving, by the server, the local update. In particular, the server can receive a plurality of local updates from a plurality of user devices.

At (120), method (100) can include determining a global model. In particular, the global model can be determined based at least in part on the received local update(s). For instance, the received local updates can be aggregated to determine the global model. The aggregation can be an additive aggregation and/or an averaging aggregation. In particular implementations, the aggregation of the local updates can be proportional to the partition sizes of the data examples on the user devices. In further embodiments the aggregation of the local updates can be scaled on a per-coordinate basis. Any number of iterations of local and global updates can be performed.

Figure 3:
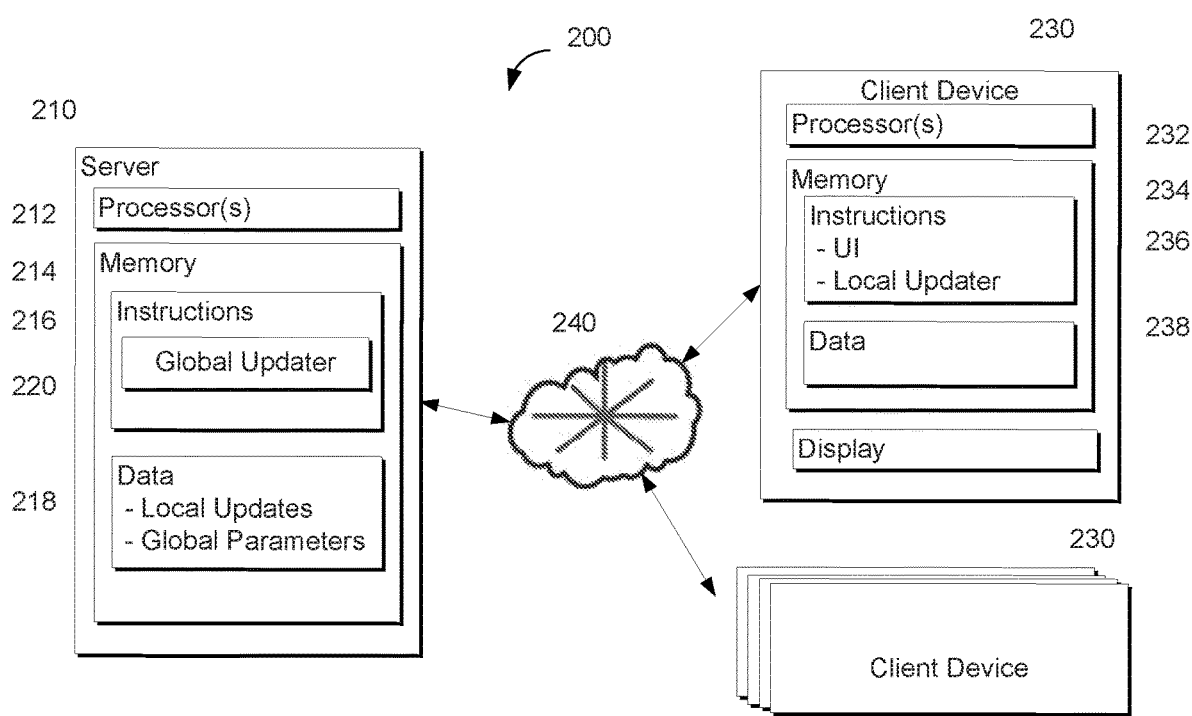
FIG. 3 depicts an example system according to example embodiments of the present disclosure.

FIG. 3 depicts an example computing system 200 that can be used to implement the methods and systems according to example aspects of the present disclosure. The system 200 can be implemented using a client-server architecture that includes a server 210 that communicates with one or more client devices 230 over a network 240.

The system 200 includes a server 210, such as a web server. The server 210 can be implemented using any suitable computing device(s), and can correspond to server 304 of FIG. 1. The server 210 can have one or more processors 212 and one or more memory devices 214. The server 210 can also include a network interface used to communicate with one or more client devices 230 over the network 240. The network interface can include any suitable components for interfacing with one more networks, including for example, transmitters, receivers, ports, controllers, antennas, or other suitable components.

The one or more processors 212 can include any suitable processing device, such as a microprocessor, microcontroller, integrated circuit, logic device, or other suitable processing device. The one or more memory devices 214 can include one or more computer-readable media, including, but not limited to, non-transitory computer-readable media, RAM, ROM, hard drives, flash drives, or other memory devices. The one or more memory devices 214 can store information accessible by the one or more processors 212, including computer-readable instructions 216 that can be executed by the one or more processors 212. The instructions 216 can be any set of instructions that when executed by the one or more processors 212, cause the one or more processors 212 to perform operations. For instance, the instructions 216 can be executed by the one or more processors 212 to implement global updater 220. The global updater 220 can be configured to receive one or more local updates and to determine a global model based at least in part on the local updates.

As shown in FIG. 3, the one or more memory devices 214 can also store data 218 that can be retrieved, manipulated, created, or stored by the one or more processors 212. The data 218 can include, for instance, local updates, global parameters, and other data. The data 218 can be stored in one or more databases. The one or more databases can be connected to the server 210 by a high bandwidth LAN or WAN, or can also be connected to server 210 through network 240. The one or more databases can be split up so that they are located in multiple locales.

The server 210 can exchange data with one or more client devices 230 over the network 240. Any number of client devices 230 can be connected to the server 210 over the network 240. Each of the client devices 230 can be any suitable type of computing device, such as a general purpose computer, special purpose computer, laptop, desktop, mobile device, navigation system, smartphone, tablet, wearable computing device, a display with one or more processors, or other suitable computing device. In some implementations, the client devices 230 can correspond to user devices 302 of FIG. 1.

Similar to the server 210, a client device 230 can include one or more processor(s) 232 and a memory 234. The one or more processor(s) 232 can include one or more central processing units (CPUs), graphics processing units (GPUs) dedicated to efficiently rendering images or performing other specialized calculations, and/or other processing devices. The memory 234 can include one or more computer-readable media and can store information accessible by the one or more processors 232, including instructions 236 that can be executed by the one or more processors 232 and data 238. The data 238 can include one or more data examples to be used in solving one or more optimization problems. The data examples of each client device 230 can be distributed unevenly among the client devices, such that no client device 230 includes a representative sample of the overall distribution of the data examples. The memory 234 can store instructions 236 for implementing a local updater configured to determine one or more local updates according to example aspects of the present disclosure.

The client device 230 of FIG. 3 can include various input/output devices for providing and receiving information from a user, such as a touch screen, touch pad, data entry keys, speakers, and/or a microphone suitable for voice recognition.

The client device 230 can also include a network interface used to communicate with one or more remote computing devices (e.g. server 210) over the network 240. The network interface can include any suitable components for interfacing with one more networks, including for example, transmitters, receivers, ports, controllers, antennas, or other suitable components.

The network 240 can be any type of communications network, such as a local area network (e.g. intranet), wide area network (e.g. Internet), cellular network, or some combination thereof. The network 240 can also include a direct connection between a client device 230 and the server 210. In general, communication between the server 210 and a client device 230 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A device for performing voice recognition; the device comprising:
   a microphone;
   a speaker;
   one or more processors; and
   one or more memory devices, the one or more memory devices storing:
      a machine-learned voice recognition model; and
      computer-readable instructions that when executed by the one or more processors cause the one or more processors to perform operations, the operations comprising:
         determining a local model update associated with an objective function based at least in part on a number of local data examples stored by the device, the local model update being determined by performing a number of iterations of a gradient descent training technique on a local version of the machine-learned voice-recognition model with respect to the number of local data examples stored by the device;
         providing the local model update to a central computing system for use in determination of a global version of the machine-learned voice-recognition model based on aggregation of the local model update with one or more additional local model updates received from one or more additional devices, the aggregation of the local model update with the one or more additional local model updates comprising application of a weighting term to each local model update; the weighting term for each local model update being proportional to the number of local data examples stored on the corresponding device;
         receiving the global version of the machine-learned voice-recognition model from the central computing system; and
         employing the global version of the machine-learned voice-recognition model to produce voice recognition predictions based on voice data captured by the microphone.

2. The device of claim 1, wherein one or more of the number of local data examples stored by the device are generated through interaction of a user with the device.

3. The device of claim 2, wherein the one or more of the number of local data examples generated through interaction of the user with the device comprise audio files.

4. The device of claim 1, wherein the machine-learned voice recognition model comprises a convolutional neural network.

5. A device for performing voice recognition, the device comprising:
a microphone;
a speaker;
one or more processors; and
one or more memory devices, the one or more memory devices storing computer-readable instructions that when executed by the one or more processors cause the one or more processors to perform operations, the operations comprising:
accessing a global version of a machine-learned voice-recognition model, wherein the global version of the machine-learned model has been generated based on aggregation of a plurality of local model updates respectively generated by a plurality of additional devices, the aggregation of the plurality of local model updates comprising application of a weighting term to each local model update, the weighting term for each local model update being proportional to a number of local data examples stored on the additional device that generated the local model update;
capturing voice data with the microphone; and
employing the global version of the machine-learned voice-recognition model to produce voice recognition predictions based on the voice data captured by the microphone.

6. The device of claim 5, wherein one or more of the number of local data examples stored by each additional device are generated through interaction of a respective user with the additional device.

7. The device of claim 6, wherein the one or more of the number of local data examples generated through interaction of the respective user with the additional device comprise audio files.

8. The device of claim 5, wherein the machine-learned voice recognition model comprises a convolutional neural network.

9. A computer-implemented method of performing voice recognition, the method comprising:
receiving, by a device that comprises a microphone and a speaker, a global version of a machine-learned voice-recognition model obtained from a central computing system, wherein the global version of the machine-learned model has been generated based on aggregation of a plurality of local model updates respectively generated by a plurality of additional devices, the aggregation of the plurality of local model updates comprising application of a weighting term to each local model update, the weighting term for each local model update being proportional to a number of local data examples stored on the additional device that generated the local model update; and
capturing, by the device using the microphone, voice data; and
employing, by the device, the received global version of the machine-learned voice recognition model to produce voice recognition predictions based on the voice data captured by the microphone.

10. The computer-implemented method of claim 9, wherein one or more of the number of local data examples stored by each additional device are generated through interaction of a respective user with the additional device.

11. The computer-implemented method of claim 10, wherein the one or more of the number of local data examples generated through interaction of the respective user with the additional device comprise audio files.

12. The computer-implemented method of claim 9, wherein the machine-learned voice recognition model comprises a convolutional neural network.

13. A computer-implemented method of performing voice recognition, the method comprising:
determining, by a first device that comprises a microphone, a speaker, and a machine-learned voice recognition model, a local model update to the machine-learned voice recognition model based at least in part on a gradient of a loss function and a number of locally stored data examples;
providing, by the first device, the local model update to a central computing system for use in determination of a global update to the machine-learned voice recognition model by the central computing system via aggregation of the local model update with one or more additional local model updates received from one or more additional devices, the aggregation of the local model update with the one or more additional local model updates comprising application of a weighting term to each local model update, the weighting term for each local model update being proportional to the number of locally stored data examples stored on the corresponding device;
receiving, by a second device that comprises a microphone and a speaker, the machine-learned voice recognition model from the central computing system after application of the global update to the machine-learned voice recognition model by the central computing system; and
employing, by the second device, the received machine-learned voice recognition model to produce voice recognition predictions based on voice data captured by the microphone of the second device.

14. The computer-implemented method of claim 13, wherein one or more of the number of locally stored data are generated through interaction of a user with the first device.

15. The computer-implemented method of claim 14, wherein the one or more of the number of locally stored data are generated through interaction of the user with the first device comprise audio files.

* * * * *